US00RE43263E

(19) United States
(12) Reissued Patent
Barragan Perez et al.

(10) Patent Number: US RE43,263 E
(45) Date of Reissued Patent: Mar. 27, 2012

(54) METHOD FOR OPERATING A FREQUENCY CONVERTER CIRCUIT

(75) Inventors: Luis A. Barragan Perez, Saragossa (ES); Jose M. Burdio Pinilla, Saragossa (ES); Pablo J. Hernandez Blasco, Saragossa (ES); Sergio L. Gil, Saragossa (ES); Alfonso L. Perez, Saragossa (ES); Fernando M. Aznar, Saragossa (ES)

(73) Assignee: BSH Bosch und Siemens Hausgeraete GmbH, Munich (DE)

(21) Appl. No.: 13/050,200

(22) Filed: Mar. 17, 2011

Related U.S. Patent Documents

Reissue of:
(64) Patent No.: 7,504,607
Issued: Mar. 17, 2009
Appl. No.: 10/578,107
PCT Filed: Nov. 2, 2004
PCT No.: PCT/EP2004/052755
§ 371 (c)(1),
(2), (4) Date: Jul. 17, 2006
PCT Pub. No.: WO2005/043737
PCT Pub. Date: May 12, 2005

(30) Foreign Application Priority Data

Nov. 3, 2003 (ES) ..... 200302616

(51) Int. Cl.
*H05B 6/06* (2006.01)
(52) U.S. Cl. ..... 219/624; 219/625
(58) Field of Classification Search ..... 219/624, 219/625
See application file for complete search history.

(56) References Cited

U.S. PATENT DOCUMENTS 4,092,510 A 5/1978 Kiuchi et al.
5,319,174 A 6/1994 Omori et al.
5,932,934 A 8/1999 Hofstetter et al.
6,018,154 A 1/2000 Izaki et al.
6,528,770 B1 3/2003 Akel et al.

FOREIGN PATENT DOCUMENTS

DE 196 54 268 A1 7/1997
EP 0286044 A2 10/1988
EP 0 888 033 12/1998
EP 0 926 926 A1 6/1999
JP 8-213163 8/1996

*Primary Examiner* — Joseph Chang
(74) *Attorney, Agent, or Firm* — James E. Howard; Andre Pallapies

(57) ABSTRACT

[A frequency converter circuit has at least two outputs that are respectively connected to a load, in particular an induction coil. A first output is operated at a first switching frequency and a second output is simultaneously operated at a second switching frequency that is different from the first, in such a way that noise having a frequency generated by the superposition of the first switching frequency and the second switching frequency is produced. The frequency converter circuit is operated in such a way that the frequency of the noise is lower than a first cutoff frequency and/or is higher than a second cutoff frequency.] *An induction cooking device includes first and second induction heating elements, and a frequency converter circuit including first and second power outputs electrically coupled to the first and second induction heating elements, respectively. The frequency converter circuit generates first and second power output signals with first and second switching frequencies applied to the first and second power outputs, respectively. The second switching frequency is selected to be no greater than a first cut-off frequency and no less than a second cut-off frequency (e.g., higher than the first cut-off frequency). The induction cooking device regulates electrical power applied to the first and/or second outputs by adjusting the switching frequency and/or a duration during which at least one of the first and second switching frequencies are applied in a repeating cycle during which the electrical power applied to the first and/or second outputs.*

25 Claims, 3 Drawing Sheets

METHOD FOR OPERATING A FREQUENCY CONVERTER CIRCUIT

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to a method for operating a frequency converter circuit comprising at least two outputs that are respectively connected to a load, especially an induction coil, wherein a first output is operated at a first switching frequency and a second output is simultaneously operated at a second switching frequency that is different from the first in such a way that noise having a frequency generated by the superposition of the first switching frequency and the second switching frequency is produced.

Modern induction cooking surfaces are usually equipped with two or four induction cooking zones. The induction cooking zones have induction coils which are supplied with high-frequency operating currents by means of converter circuits. It is known to operate two induction coils jointly by means of one converter circuit with two outputs, each of the outputs being connected to an induction coil. Various procedures have been proposed for avoiding or reducing noise when both outputs are operated simultaneously.

Known from DE 196 54 268 C2 is a method for operating the converter circuit where both outputs of the converter circuit are operated in time multiplex so that no noise can occur. The disadvantage of this method is that elaborate triggering and over-dimensioning of the power electronics is required.

If the outputs are not operated in time multiplex and the two induction coils are supplied simultaneously with operating currents at different frequency, noise is produced. It is known to reduce this noise by means of choking coils connected in series to the induction coil. The disadvantage of this method is that the method is not always stable. In addition, the noise can only be damped and the choking coils are required as additional components, making the converter circuit more elaborate.

SUMMARY OF THE INVENTION

It is the object of the invention to provide an improved and cost-effective method for operating a converter circuit comprising at least two outputs, especially for an induction cooking surface.

This object is solved by a method for operating a converter circuit having the features of claim 1.

In a converter circuit comprising at least two outputs that are respectively connected to a load, especially an induction coil, a first output is operated at a first switching frequency and a second output is simultaneously operated at a second switching frequency that is different from the first. In this way noise having a frequency generated by the superposition of the first switching frequency and the second switching frequency is produced. The converter circuit is operated in such a way that the frequency of the noise is lower than a first cut-off frequency and/or higher than a second cut-off frequency. This procedure has the advantage that noise can be produced at a frequency that lies outside the human audible range by appropriately selecting the first cut-off frequency and the second cut-off frequency. Furthermore, the induction coils can be operated at frequencies at which a high efficiency can be achieved. In addition, additional components such as choking coils for reducing the noise can be dispensed with.

According to a preferred embodiment, it is provided that the first switching frequency and/or the second switching frequency are operated in such a way that the frequency of the noise is lower than the first cut-off frequency and/or higher than the second cut-off frequency. The switching frequencies of the outputs can be simply adapted by means of intelligent power switches.

Advantageously an electrical power of at least one of the outputs is regulated by means of a relative switch-on time and/or the switching frequency. Thus, the converter circuit can be operated with the induction coils in such a way that a high efficiency is achieved.

According to a preferred embodiment, it is provided that the first cut-off frequency and/or the second cut-off frequency are determined depending on a level of the noise. In this way, the cut-off frequencies can be adapted to the human audibility threshold so that the noise cannot be perceived.

In particular, the first cut-off frequency and/or the second cut-off frequency are determined depending on a total electrical power of the outputs. The level of the noise depends on the total electrical power of the outputs and the total electrical power can easily be determined. In this way, the cut-off frequencies can be adapted especially easily to the human audibility threshold.

According to a preferred embodiment, it is provided that the first cut-off frequency is 2 kilohertz and/or the second cut-off frequency is 14 kilohertz. For these cut-off frequencies the human audibility threshold is very high so that the level of the noise does not reach the human audibility threshold or only insignificantly exceeds it.

In particular, the invention relates to an induction cooking device such as, for example, an induction cooking surface or a cooker with an induction heating element.

The invention and its further developments are explained in detail hereinafter with reference to drawings:

In the figures

DESCRIPTION OF THE PREFERRED EMBODIMENTS

Figure 1A:
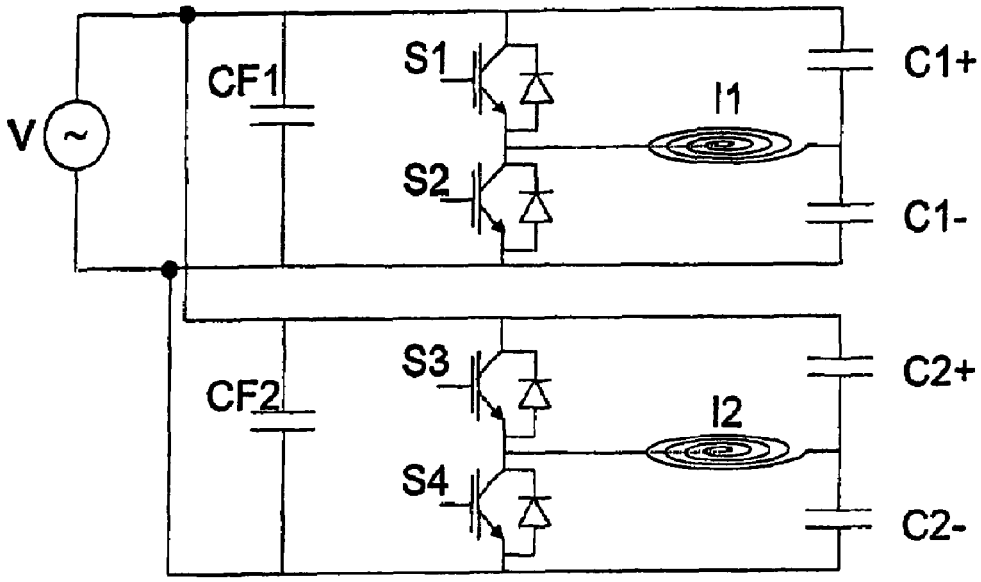
FIG. 1a is a first embodiment of a converter circuit.
Figure 1B:
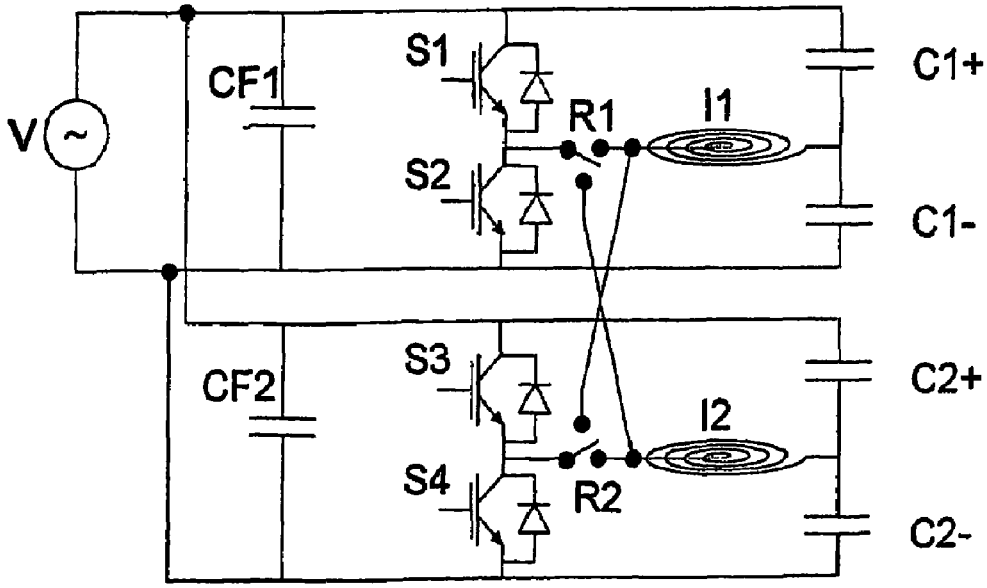
FIG. 1b is a second embodiment of a converter circuit.

FIGS. 1a and 1b are schematic diagrams showing two different embodiments of a converter circuit comprising two outputs or induction coils. Here V designates a voltage source, I1 is a first and I2 is a second induction coil, S1, S2, S3 and S4 are high-frequency switches, CF1 and CF2 are capacitive input filters and C1+, C1−, C2+ and C2− are capacitors. The second embodiment (FIG. 1b) differs from the first embodiment (FIG. 1a) in that two changeover switches R1, R2 are provided for reconfiguring the topology for the case when both induction coils I1, I2 are not switched on or both outputs are not active.

Figure 2:
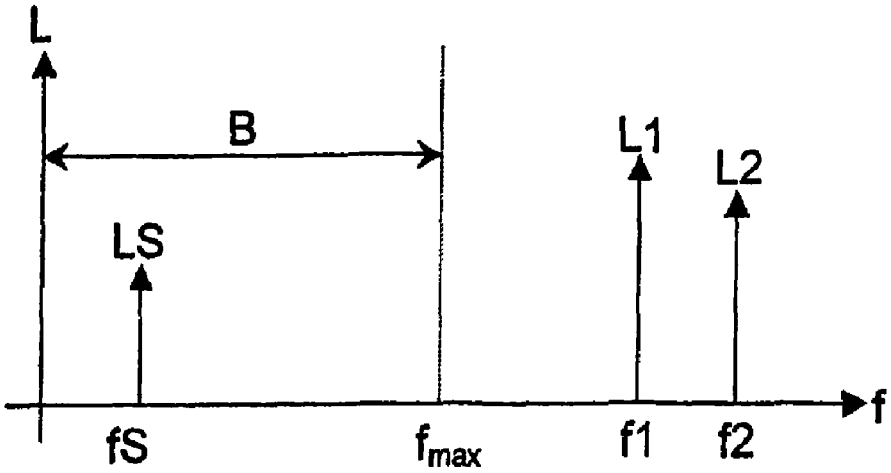
FIG. 2 is a schematic diagram of possible noise frequencies during operation of the converter circuits according to FIG. 1.

FIG. 2 shows a schematic diagram of possible frequencies of the noise during operation of the converter circuits according to FIG. 1a or 1b. The first induction coil I1 is operated at a first switching frequency f1 and the second induction coil I2 is operated at a second switching frequency f2 which is higher than the first switching frequency f1. Both switching frequencies f1, f2 lie above a maximum frequency $f_{max}$ which can be perceived by human hearing. In this way, noise produced at the switching frequencies f1 and f2 cannot be heard by humans. As a result of a superposition of the two switching frequencies f1, f2, further noise is produced, for example, at a frequency fS which corresponds to a difference comprising the second switching frequency f2 minus the first switching frequency f1. This frequency fS can lie in a frequency band B which indicates the frequencies perceptible by humans. The noise can have different levels L1, L2, LS at different frequencies f1, f2, fS which is indicated by arrows of different length at the frequencies f1, f2 and fS in FIG. 2.

Figure 3:
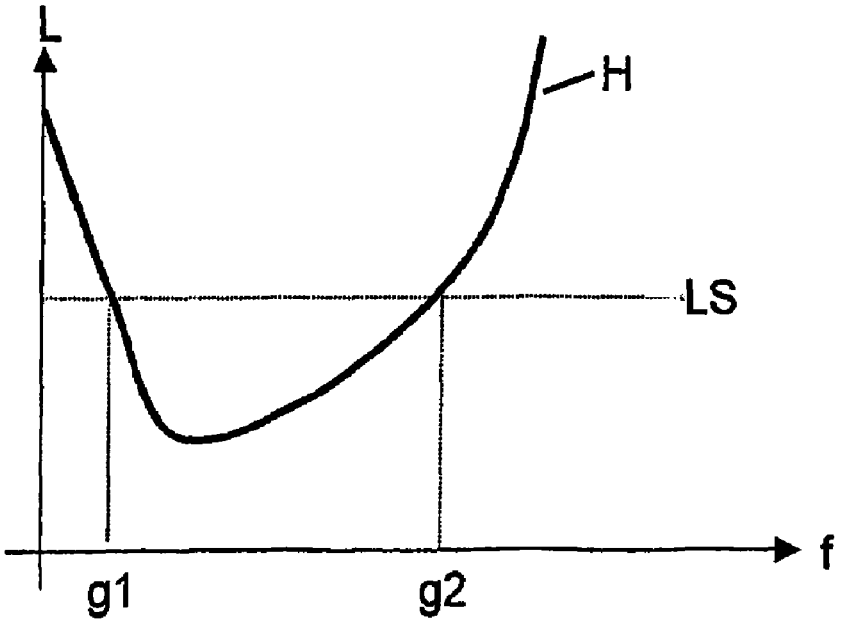
FIG. 3 is a schematic profile of the human audibility threshold.

FIG. 3 shows a schematic profile of the human audibility threshold H. Depending on the frequency f, a different minimum noise level L can be perceived by the human hearing which is indicated by the profile of the audibility threshold H in FIG. 3. A first cut-off frequency g1 and a second cut-off frequency g2 are determined using the level LS of the noise and its points of intersection with the profile of the audibility threshold H, the first cut-off frequency g1 being lower than the second cut-off frequency g2. The converter circuits according to FIGS. 1a and 1b are operated according to the invention so that the frequency fS of the noise is lower than the first cut-off frequency g1 or higher than the second cut-off frequency g2. In this way the noise is outside the human hearing range and thus cannot be perceived. The level LS of the predicted noise can, for example, be estimated using the switching frequencies f1, f2 and the electrical powers P1 and P2 supplied to the induction coils. Alternatively, experimental cut-off frequencies g1, g2 can be defined, for example, the first cut-off frequency g1 at 2 kilohertz and the second cut-off frequency g2 at 14 kilohertz.

Figure 4:
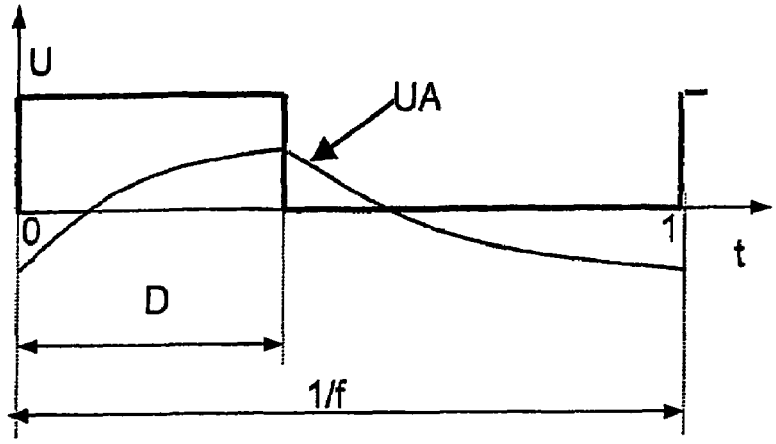
FIG. 4 is a schematic time profile of a period of an output voltage of the converter circuits according to FIG. 1

Parameters for adapting the electrical powers P1, P2 supplied to the induction coils I1, I2 are firstly the switching frequencies f1, f2 and secondly a relative switch-on time D. FIG. 4 shows a schematic time profile of a period of a first output voltage UA of the converter circuit according to FIGS. 1a and 1b. The period 1/f is normalised to unity in FIG. 4. The output voltage UA increases during the relative switch-on time D and then decreases slowly again. The electrical powers P1, P2 supplied to the induction coils I1, I2 are highest for relative switch-on times D of 0.5.

Figure 5:
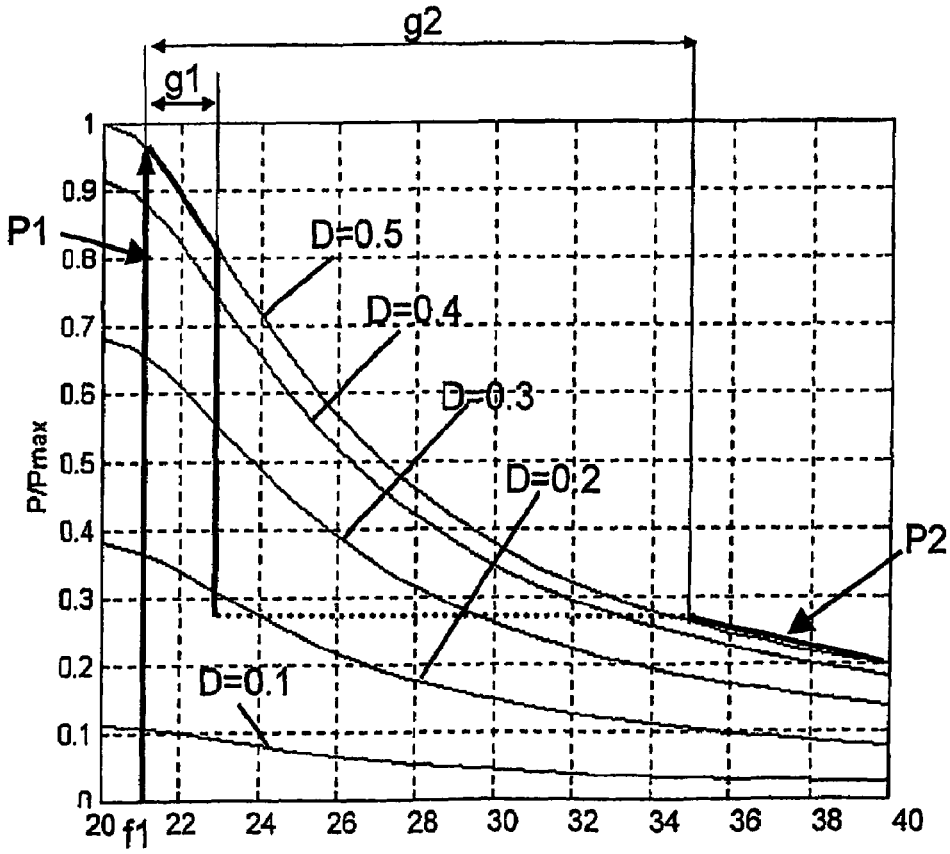
FIG. 5 is a schematic diagram of an adaptation of electrical output powers for the converter circuits according to FIG. 1 taking into account a first and a second cut-off frequency.

FIG. 5 shows a schematic diagram of an adaptation of the electrical output powers P1 and P2 for the two induction coils I1, I2 according to the converter circuits from FIGS. 1a and 1b taking into account the two cut-off frequencies g1 and g2. For the first induction coil I1, for example, which requires the higher electrical power P1 of the two induction coils I1, I2, the switching frequency f1 is specified as 21 kilohertz for example and the relative switch-on time D is specified as 0.5. The electrical power P2 for the second induction coil I2 is now adjusted by means of the relative switch-on time D and by means of the switching frequency f2 taking into account the two cut-off frequencies g1 and g2. The second switching frequency f2 can lie in a range between the first switching frequency f1 (here 21 kilohertz) and the sum of the first switching frequency f1 and the first cut-off frequency g1 (here 23 kilohertz) and above the sum of the first switching frequency f1 and the second cut-off frequency g2 (here 35 kilohertz). In this way it is ensured that the noise at the frequency fS which is produced from the difference between the second switching frequency f2 and the first switching frequency f1 is not perceived by the human hearing.

REFERENCE LIST

B frequency band
C1+ capacitor
C1 capacitor
C2+ capacitor
C2 capacitor
CF1 capacitive input filter
CF2 capacitive input filter
D relative switch-on time
f frequency
$f_{max}$ maximum frequency perceived by human hearing
f1 switching frequency of the first induction coil
f2 switching frequency of the second induction coil
fS frequency of the noise
g1 first cut-off frequency
g2 second cut-off frequency
H audibility threshold
I1 first induction coil
I2 second induction coil
L sound level
L1 sound level at the first switching frequency
L2 sound level at the second switching frequency
LS level of noise at fS
P electrical power
P1 electrical power of the first induction coil
P2 electrical power of the second induction coil
R1 changeover switch
R2 changeover switch
t time
U voltage
UA output voltage
V voltage source

We claim:

1. A method of operating a frequency converter circuit having at least two outputs respectively connected to a load, the method which comprises:

operating a first output at a first switching frequency and simultaneously operating a second output at a second switching frequency different from the first switching frequency to produce noise having a frequency generated by a superposition of the first switching frequency and the second switching frequency;

operating the converter circuit to set the first switching frequency and the second switching frequency such that the frequency of the noise is lower than a first cut-off frequency or higher than a second cut-off frequency, the second cut-off frequency being higher than the first cut-off frequency; and regulating an electrical power of at least one of the first and second outputs by adjusting the switching frequency and the relative switch-on time.

2. The method according to claim 1, wherein the load is an induction coil.

3. The method according to claim 1, which comprises determining the first cut-off frequency and/or the second cut-off frequency in dependence on a level of the noise.

4. The method of claim 3, further comprising the step of estimating a level of the noise using the first and second switching frequencies of the first and second outputs and the electrical power supplied to the loads.

5. The method according to claim 1, which comprises determining the first cut-off frequency and/or the second cut-off frequency in dependence on a total electrical power of the outputs.

6. The method according to claim 1, which comprises setting the first cut-off frequency at 2 kilohertz and/or setting the second cut-off frequency at 14 kilohertz.

7. The method of claim 1, wherein:

the first switching frequency is determined according to the required electrical power;

the relative switch-on time of 0.5 is used for the first output; and the electrical power of the second load is adjusted using the relative switch-on time and the second switching frequency, and taking into account the first and second cut-off frequencies.

8. The method of claim 1, wherein the frequency of the noise corresponds to a difference between the second switching frequency and the first switching frequency.

*9. A cooktop including:*

*a pair of induction coils; and*

*a frequency converter circuit having a first output connected to a first of the pair of induction coils and a second output connected to a second of the pair of induction coils, the pair of induction coils being either individually or simultaneously operable,*

*the first output being associated with a first switching frequency and the second output being associated with a second switching frequency, wherein, if the first and second switching frequencies are different from one another, noise having a noise frequency is generated when the pair induction coils is operated simultaneously,*

*wherein the first switching frequency and the second switching frequency are set or configured to have values such that the noise frequency is either above or below a human audibility threshold range associated with first and second cut-off frequencies, the second cut-off frequency being higher than the first cut-off frequency, and*

*wherein, when the first switching frequency is set for a user operated power setting and a selected switch-on time, the second switching frequency is selected to be in a range of frequencies extending from the first switching frequency to a sum of the first switching frequency and the first cut-off frequency, and/or above a sum of the first switching frequency and the second cut-off frequency, the second switching frequency being associated with the selected switch-on time.*

*10. The cooktop of claim 9, wherein the switch-on time is 0.5.*

*11. A cooktop including:*

*a pair of induction coils; and*

*a frequency converter circuit having a first output connected to a first induction coil of the pair of induction coils and a second output connected to a second induction coil of the pair of induction coils, the pair of induction coils being either individually or simultaneously operable,*

*the first output being associated with a first switching frequency and the second output being associated with a second switching frequency, wherein noise having a noise frequency is generated by superposition of the first switching frequency and the second switching frequency when the pair induction coils is operated simultaneously;*

*wherein the first switching frequency and the second switching frequency are set to have values such that the noise frequency is either above or below a human audibility threshold range associated with first and second cut-off frequencies, the second cut-off frequency being higher than the first cut-off frequency, and*

*wherein the frequency converter circuit is configured to control the first induction coil to operate at a first switching frequency for a user operated power setting at a selected switch-on time of 0.5, and the frequency converter circuit is configured to determine the second switching frequency along the selected switch-on time and taking into account the first and second cut-off frequencies.*

*12. The cooktop of claim 11, wherein the second switching frequency is (1) equal to a sum of the first switching frequency and the first cut-off frequency, and or (2) above a sum of the first switching frequency and the second cut-off frequency.*

*13. A cooktop including:*

*a pair of induction heating units; and*

*a frequency converter circuit having a first output connected to a first induction heating unit of the pair of induction heating units and a second output connected to a second induction heating unit of the pair of induction heating units, the pair of induction heating units being either individually or simultaneously operable,*

*the first output being associated with a first switching frequency and the second output being associated with a second switching frequency different from the first switching frequency in which case noise having a noise frequency is generated by superposition of the first switching frequency and the second switching frequency when the pair induction heating units is operated simultaneously;*

*wherein the frequency converter circuit is configured to set or determine the first switching frequency and the second switching frequency such that the noise frequency is generally outside a human audibility threshold range, or only insignificantly within it, during simultaneous operation,*

*wherein the frequency converter circuit is configured to establish the first switching frequency for a first user selected power setting and a selected switch-on time, and to establish the second switching frequency for a second user selected power setting for the selected switch-on time, and wherein the second switching frequency is (1) substantially equal to the first switching frequency, and/or (2) equal to or above a sum of the first switching frequency and an upper cut-off frequency associated with the threshold range.*

*14. The cooktop of claim 13, wherein the threshold range is associated with a lower cut-off frequency.*

*15. The cooktop of claim 14, wherein the upper cut-off frequency is higher than the lower cut-off frequency.*

*16. The cooktop of claim 13, wherein the switch-on time is 0.5.*

*17. The cooktop of claim 13, wherein each of the first and second heating elements comprises a coil.*

*18. The cooktop of claim 13, not including a multiplexing unit.*

*19. The cooktop of claim 13, not including a choking coil.*

*20. The cooktop of claim 13, further comprising a first power switch and a second power switch associated, respectively, with the first and second inductive heating units.*

*21. The cooktop of claim 13, herein the first and second switching frequencies lie above a maximum frequency that can be perceived by a human.*

*22. A converter circuit for an induction cooking device having first and second induction coils, the converter circuit comprising:*

*an inlet connectable to a voltage source;*

*a first circuit having a high frequency switch converting power from the voltage source to a first high frequency output power applied to the first induction coil, wherein the first high frequency output power has a frequency (f1) corresponding to a switching frequency of the first high frequency switch;*

*a second circuit having a high frequency switch converting power from the voltage source to a second high frequency output power applied to the second induction coil, wherein the second high frequency output power has a frequency (f2) corresponding to a switching frequency of the second high frequency switch,*

*wherein the difference between the frequencies f2 and f1 is no greater than a predetermined lower threshold and is no less than a predetermined higher threshold, and*

*wherein the converter circuit regulates the power of the second high frequency output power by selecting the frequency f2 and a duration during which the second high frequency output power has the frequency f2 in a repeating cycle applied to the second high frequency output power.*

*23. An induction cooking device comprising:*

*a first induction heating element;*

*a second induction heating element;*

*a frequency converter circuit including a first power output electrically coupled to the first induction heating element and a second power output electrically coupled to the second induction heating element;*

*the frequency converter circuit generating a first power output signal applied to the first power output, wherein the first power output signal has a first switching frequency;*

*the frequency converter circuit generating a second power output signal applied to the second power output, wherein the second power output signal has a second switching frequency;*

*wherein the second switching frequency is selected by the induction cooking device to be no greater than a first cut-off frequency and no less than a second cut-off frequency, wherein the second cut-off frequency is higher than the first cut-off frequency, and*

*wherein the induction cooking device regulates an electrical power applied to at least one of the first and second outputs by adjusting the switching frequency and a duration during which at least one of the first and second switching frequencies are applied in a repeating cycle during which the electrical power applied to the at least one of the first and second outputs.*

*24. A cooktop including:*

*a pair of induction coils; and*

*a frequency converter circuit having a first output connected to a first of the pair of induction coils and a second output connected to a second of the pair of induction coils, the pair of induction coils being either individually or simultaneously operable,*

*the first output being associated with a first switching frequency and the second output being associated with a second switching frequency, wherein, if the first and second switching frequencies are different from one another, noise having a noise frequency is generated when the pair induction coils is operated simultaneously,*

*wherein the first switching frequency and the second switching frequency are set or configured to have values such that the noise frequency is either above or below a human audibility threshold range associated with first and second cut-off frequencies, the second cut-off frequency being higher than the first cut-off frequency, and*

*wherein, when the first switching frequency is set for a user operated power setting and the second switching frequency is selected to be in a range of frequencies extending from the first switching frequency to a sum of the first switching frequency and the first cut-off frequency, and/or above a sum of the first switching frequency and the second cut-off frequency, the second switching frequency being associated a selected duration during which the second switching frequency is applied to second output.*

*25. A cooktop including:*

*a pair of induction heating units; and*

*a frequency converter circuit having a first output connected to a first induction heating unit of the pair of induction heating units and a second output connected to a second induction heating unit of the pair of induction heating units, the pair of induction heating units being either individually or simultaneously operable,*

*the first output being associated with a first switching frequency and the second output being associated with a second switching frequency different from the first switching frequency in which case noise having a noise frequency is generated by superposition of the first switching frequency and the second switching frequency when the pair induction heating units is operated simultaneously;*

*wherein the frequency converter circuit is configured to set or determine the first switching frequency and the second switching frequency such that the noise frequency is generally outside a human audibility threshold range, or only insignificantly within it, during simultaneous operation,*

*wherein the frequency converter circuit is configured to establish the first switching frequency for a first user selected power setting and to establish the second switching frequency for a second user selected power setting, wherein the second switching frequency being associated a selected duration during which the second switching frequency is applied to second output, and*

*wherein the second switching frequency is (1) substantially equal to the first switching frequency, and/or (2) equal to or above a sum of the first switching frequency and an upper cut-off frequency associated with the threshold range.*

* * * * *